(12) United States Patent
Mohr

(10) Patent No.: US 6,260,693 B1
(45) Date of Patent: Jul. 17, 2001

(54) CONVEYOR DEVICE

(75) Inventor: Werner Mohr, Köln (DE)

(73) Assignee: Communication Belt Werbeflächen GmbH (DE)

( * ) Notice: Subject to any disclaimer, the term of this patent is extended or adjusted under 35 U.S.C. 154(b) by 0 days.

(21) Appl. No.: 09/322,083

(22) Filed: May 28, 1999

Related U.S. Application Data

(63) Continuation of application No. PCT/EP97/06649, filed on Nov. 28, 1997.

(30) Foreign Application Priority Data

Nov. 30, 1996 (DE) .............................. 196 49 746

(51) Int. Cl.⁷ ............................ B65G 17/06; B65G 17/38
(52) U.S. Cl. ........................................ 198/850; 198/502.1

(58) Field of Search ................................. 198/502.1, 850

(56) References Cited

U.S. PATENT DOCUMENTS

| | | | | |
|---|---|---|---|---|
| 4,979,591 | * | 12/1990 | Habegger et al. | 198/502.1 X |
| 5,209,340 | * | 5/1993 | Munkner et al. | 198/502.1 X |
| 5,244,080 | * | 9/1993 | Bierbaum | 198/502.1 X |
| 5,280,831 | * | 1/1994 | Conklin, Jr. | 198/502.1 X |
| 5,311,980 | * | 5/1994 | Munkner et al. | 198/502.1 X |
| 6,044,961 | * | 4/2000 | Hine | 198/502.1 X |

* cited by examiner

Primary Examiner—Christopher P. Ellis
Assistant Examiner—Gene O. Crawford
(74) Attorney, Agent, or Firm—Locke Liddell & Sapp LLP

(57) ABSTRACT

A conveyor device contains a driven conveyor belt having a pluarlity of individual conveyor belt segments and a driving device. The conveyor belt segments present optical information.

15 Claims, 3 Drawing Sheets

CONVEYOR DEVICE

Figure 1:
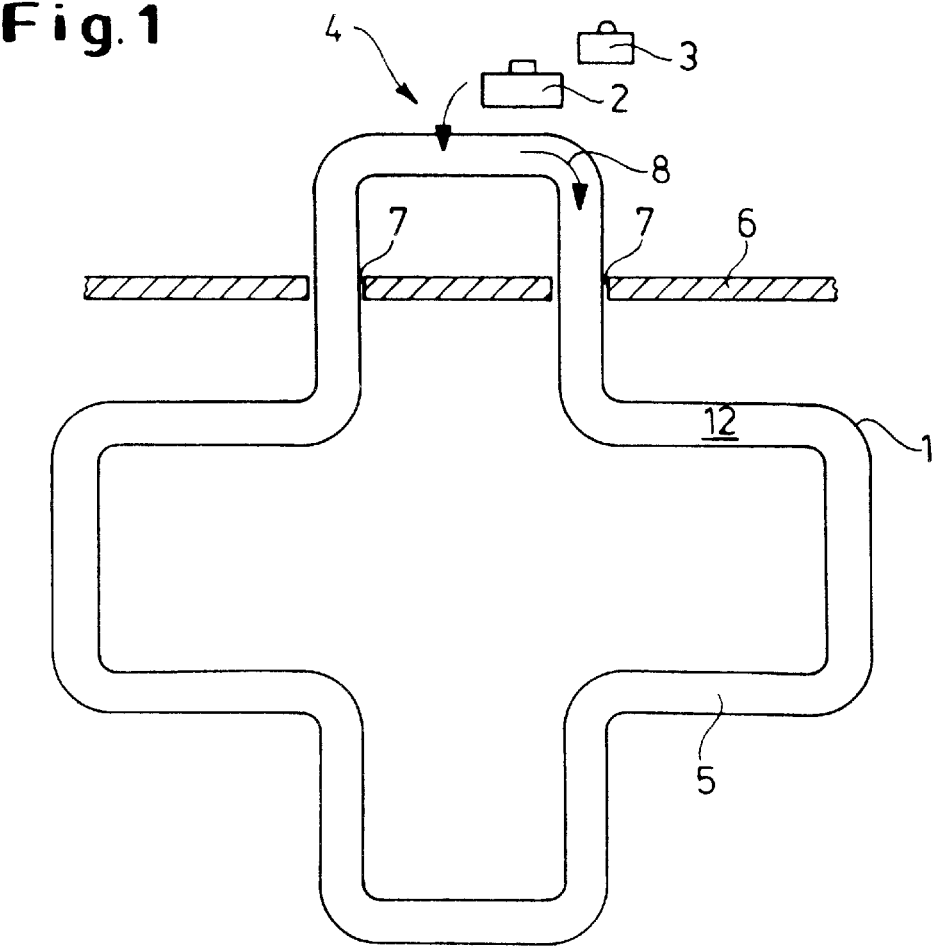

This application is a continuation of PCT/EP97/06649, filed Nov. 28, 1997.

This invention relates to a conveyor device which consists of a driven conveyor belt comprising a plurality of individual, directly or indirectly connected conveyor belt segments, and a driving device, in particular a drive engine with transmission located downstream, wherein said conveyor belt segments present optical information.

From the document DE 84 30 410.3 U1 an airport conveyor belt for transferring pieces of luggage to a luggage claim is already known, which conveyor belt includes a continuous transportation belt, in particular of the articulated type, of which the supporting plates are provided on the upper side thereof with foils for the arrangement and conveying of informative contents. These foils are pasted together with said supporting plates.

Furthermore, from the document U.S. Pat. No. 5,165,526 an airport conveyor belt is known which also consists of a plurality of individual, directly or indirectly connected driven conveyor belt segments. Each conveyor belt segment includes a thin foil carrying visual information arranged on the bottom side of the transparent conveyor belt segments. In this case, the conveyor belt segments are screwed to a sub-structure, so that for interchanging the optical information all the conveyor belt segments that are provided with optical information have to be dismounted. Accordingly, a disadvantage in this pre-known conveyor device is that the optical information is arranged between a supporting means and the conveyor belt segments mounted onto said supporting means.

A similar conveyor device is additionally known from the document WO 93/03472 in which foils are pasted onto the conveyor belt segments, which foils are subsequently covered with a transparent foil or with transparent plates, wherein an essential disadvantage of this construction is that the interchanging of visual information is labor-consuming and expensive, since removing the transparent foils or the foils carrying the visual information has the consequence of long stoppage periods of the conveyor device. Moreover, in an arrangement where the foils are pasted onto the conveyor belt segments the problem arises that these foils are scratched to pieces and are destroyed very rapidly by the pieces of luggage sliding onto the belt, so that the visual information becomes partly invisible or fully invisible after a very short time. Therefore, with this method the advertising effect is lost very rapidly.

Starting from this prior art, the invention is based on the problem of further developing a conveyor device of this kind in such a manner that optical information can be arranged in a simple way, remains intact at least for a given period and is easily interchangeable, wherein said optical information can easily be attached to existing conveyor devices.

The solution of this problem provides for the optical information forming an integral part of a conveyor belt segment, wherein the optical information as a closed unit is limited to one conveyor belt segment or covers several conveyor belt segments at the same time.

Particularly, the conveyor device according to the invention enables the advantage to be obtained that by the integral arrangement of the optical information in each conveyor belt segment this optical information remains intact over a long period of time, so that it is also visible for a long time. In addition, a simple and consequently inexpensive arrangement of the optical information on each conveyor belt segment is possible, whereby the special advantage is obtained that already existing conveyor devices can be provided with the optical information here under discussion.

For example, the optical information can be vulcanized onto the conveyor belt segments which consist of flexible plastics. An alternative provides for the optical information being engraved, etched, eroded or otherwise machined in the conveyor belt segments. In this connection, both conveyor belt segments made of flexible plastics and conveyor belt segments made of metal are possible.

Thereafter, the optical information can be visually emphasized by the introduction of color particles in the recesses and deepenings that are formed by machining.

A preferred embodiment of the invention provides for the conveyor belt segments being in a multipart form, wherein at least one part of each conveyor belt segment presents the optical information. By this construction the part of each conveyor belt segment which presents the optical information can be interchanged easily without requiring the conveyor belt segments to be completely detached from the conveyor device.

Preferably, each conveyor belt segment consists of a supporting member connected to at least one driving member, and a transparent cover member, wherein the optical information is arranged between said supporting member and said cover member, and wherein said cover member with the optical information is arranged within a recess, particularly a deepening, provided in said supporting member. In this way, the cover member covering the optical information protects the optical information from damage, so that owing to its arrangement in a recess of the supporting member said cover member, too, which for example consists of a flexible plastic material, is protected against damage and destruction. In this connection it must be taken into consideration that numerous pieces of luggage are transferred by means of such conveyor devices, which pieces of luggage frequently have sharp edges that may constitute a particular danger for the cover member or the optical information.

A further feature of this embodiment of the invention provides for the deepening joining at all the edges of the cover member. In this way, the cover member is fully integrated in the supporting member. In this case, the supporting member preferably is the conveyor belt segment customary per se which may be both rectangular and sickle-shaped and which may consist of metal or plastics. This conveyor belt segment has worked into it said recess which serves for receiving the cover member and the optical information. In this way, the cover member is accessible from the top, i.e. from the upper surface of the conveyor belt segments, so that the cover member is readily detachable, for example, for the purpose of interchanging the optical information. Preferably, this optical information is arranged on a foil or a very thin plate, so that in the case of existing conveyor devices the conveyor belt consisting of the conveyor belt segments doesn't have to be exchanged. The cover member and the optical information as a whole are of a very small material thickness, which is clearly smaller than the material thickness of usual conveyor belt segments, so that the supporting capability of the conveyor belt segments is not essentially influenced by the working in of said recess.

According to a further feature of the invention it is provided that the cover member terminates with its upper surface flush with the rim portion of the supporting member. Accordingly, in this constructions any edges are not formed that protrude beyond the upper surface of the conveyor belt and that might in case damage pieces of luggage sliding onto the conveyor belt. However, as an alternative one may also provide for the upper surface of the cover member being arranged slightly below a surface plane which is defined by the rim portions of the supporting member. By this construction the advantage is obtained in particular that pieces of luggage sliding onto the conveyor belt come into contact with the upper surface of the cover members only in part-areas, As a rule, the pieces of luggage rest on the rim portions of the supporting member and won't touch the upper surface of the cover members, so that the transparent cover members are prevented from being damaged, e.g. scratched, particularly at the time when the pieces of luggage slide onto the conveyor belt.

To facilitate the mounting of the optical information to the conveyor device, particularly at the time when the optical information is interchanged at the end of an advertising cycle, it is provided that the optical information is arranged on the surface of the cover member facing the supporting member. Doing this, the cover member can be removed from the supporting member in a single working step, with the optical information being simultaneously removed, so that the interchanging of the cover member at the same time means the interchanging of the optical information. The stand still periods of such conveyor devices during the installation of the optical information on the conveyor belt are considerably reduced thereby.

The optical information can, for example, be in the form of a color applied to the cover member. In this connection it turned out as particularly advantageous to print the optical information on the cover member. In this embodiment it is an advantage that any moisture and/or dirt detrimental to the visibility of the optical information cannot reach in between the cover member and the optical information. In addition, the mounting is facilitated, since a relative motion between the optical information and the cover member during the mounting is not possible. Therefore, a very accurate result is always obtained, which fact is particularly important especially with view to the visual impression of optical information extending over plural supporting members of the conveyor belt. Beyond, this embodiment reduces the number of individual parts to be handled during the initial mounting and during each subsequent maintenance or perfection of the conveyor device according to the invention.

Preferably, the cover member is detachably fixed to the supporting member, so that the process of interchanging the cover members does not require any dismounting of the supporting members from the conveyor device. For fixing the cover members to the supporting member screws and/or rivets turned out to be advantageous as the fixing means.

Moreover, it turned out as advantageous to detachably bond together said cover member and said supporting member. The advantage of the bonding technique resides in the fact that a sufficiently strong adhesion is provided between the cover member and the supporting member, while during the dismounting of the cover member from the supporting member care must be taken that the bonding agent to be used is removed without any residue. To this end bonding agents are particularly suited which soften when heat is applied, in order that the cover member bonded to the supporting member can be removed.

Preferably, the bonding between the cover member and the supporting member is effected in part-areas, particularly in rim portions and/or punctually. In this construction, it turned out as advantageous that the separation of the cover member from the supporting member is facilitated in the case where these two parts are bonded together only partially. In this case, the bonding should be effected in a portion which as a rule is subject to the highest loads. This portion is on the rim of the cover member or on the inner rims of the recess. This rim portion can be provided either linearly or punctually with a bonding agent that facilitates a separable bonding connection between the cover member and the supporting member. However, other bonding patterns are conceivable, too, such as diagonally extending bonding lines.

To provide an advertising surface which is a large as possible it is advantageous to form the optical information arranged on a foil or on a plate equal in area with the cover member.

Finally, it still turned out as an advantage that individual conveyor belt segments or each conveyor belt segment are formed with plural pieces of optical information. Accordingly, the possibility exists that one conveyor belt segment not only has one recess or deepening into which a cover member is inserted but instead has plural varying recesses adapted to have inserted therein correspondingly formed cover members with corresponding optical information. In this way, also smaller sections of the advertising surface can be put at the disposal of enterprises that desire to do advertising.

Figure 2:
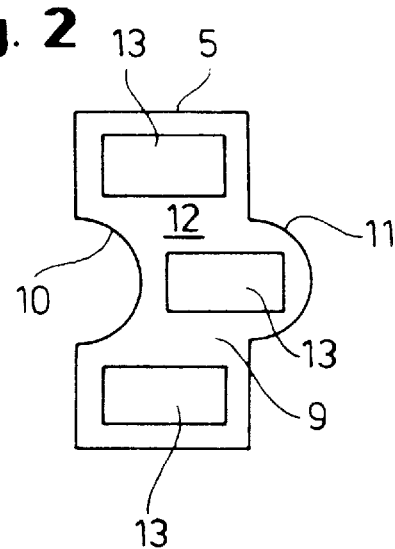
Figure 3:
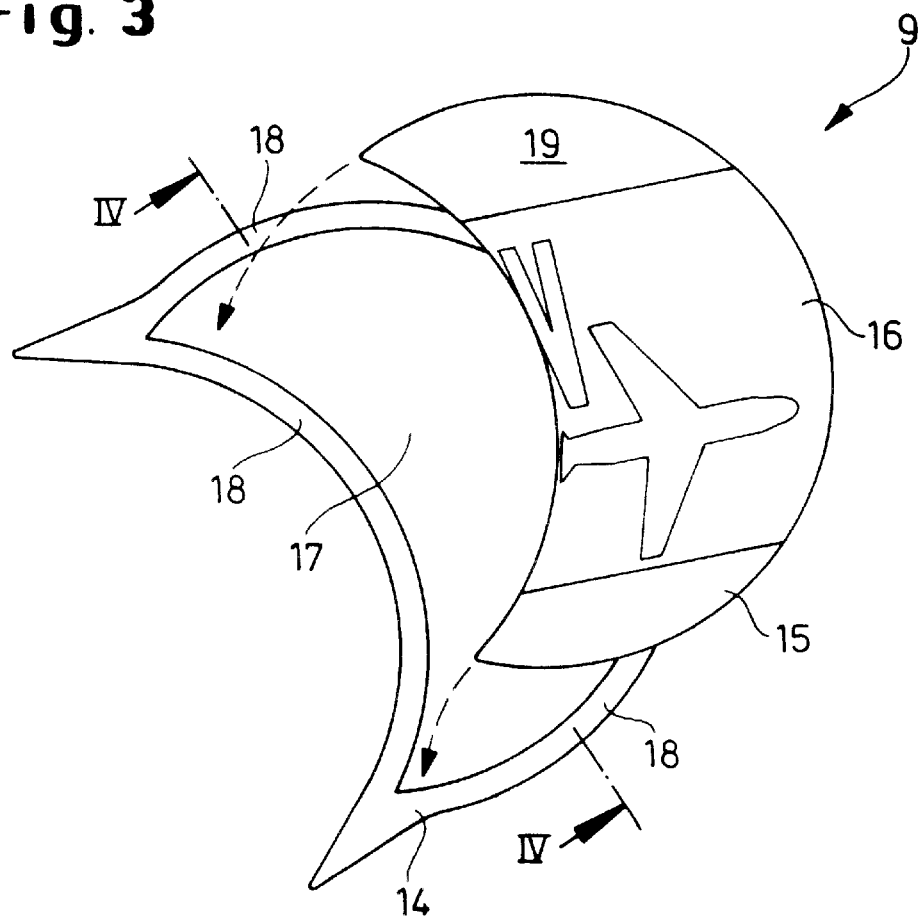
Figure 4:
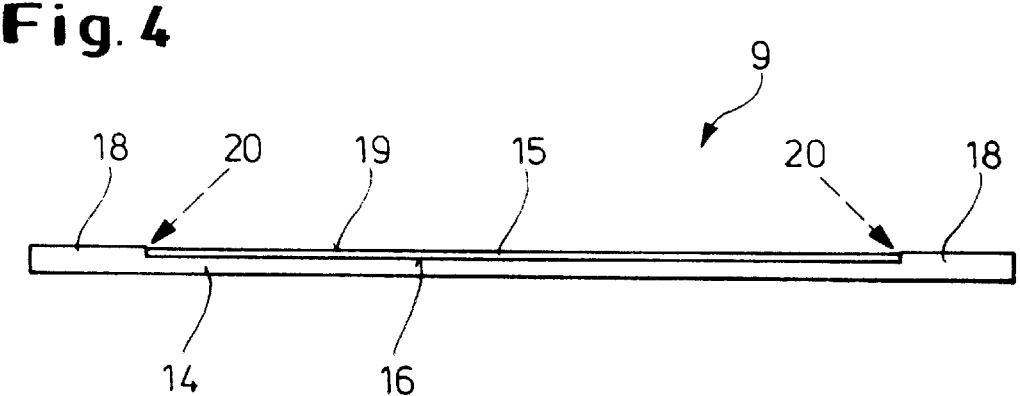
Figure 5:
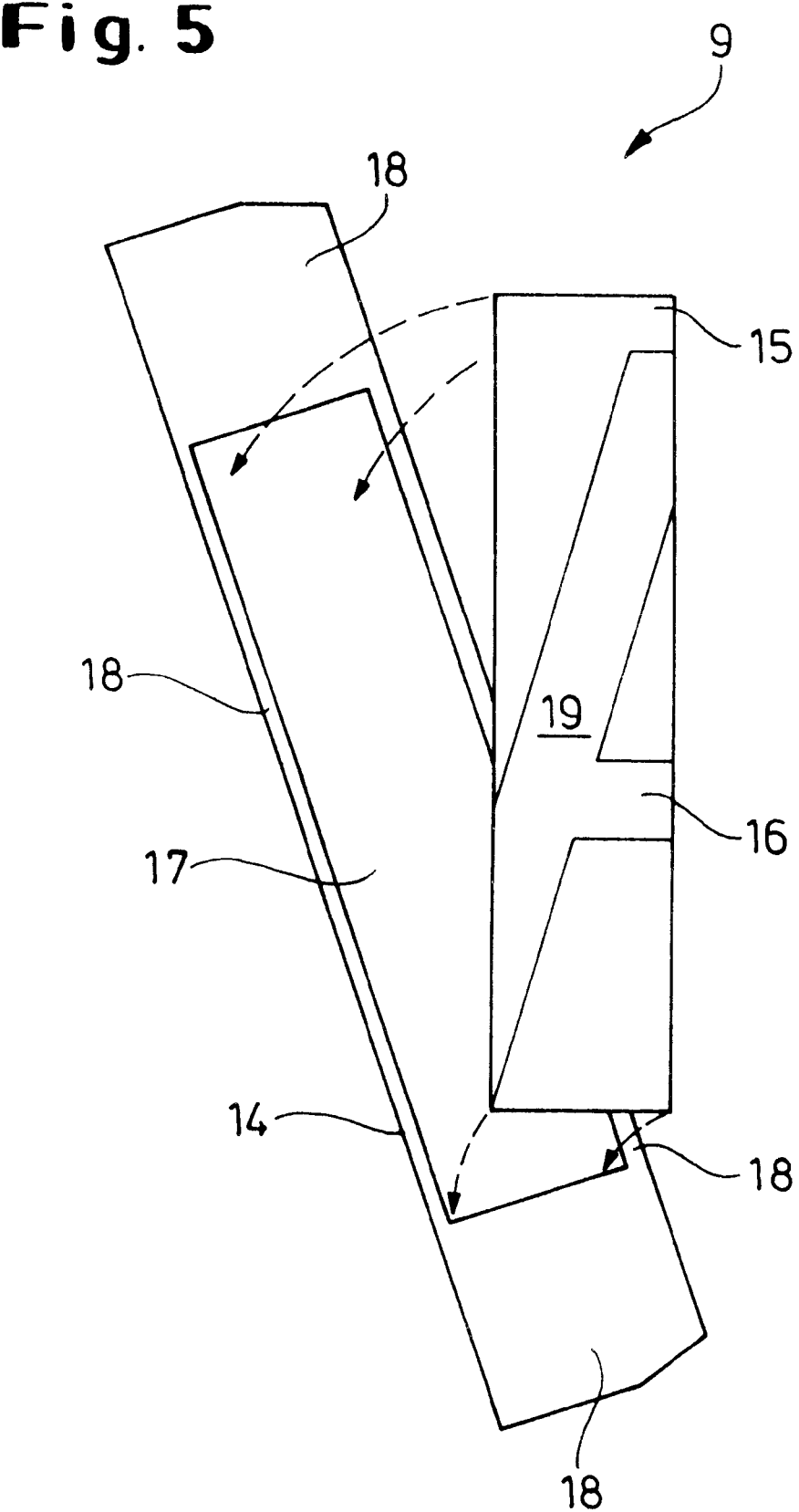

Further features and advantages of the conveyor device according to the invention become apparent from the following description and the accompanying drawings showing preferred embodiments of the conveying device. In the drawings it is shown by FIG. 1 a luggage conveyor belt in airport surroundings, in a top view;

FIG. 2 a conveyor belt segment of a conveyor belt, in a top view;

FIG. 3 a further form of construction of a conveyor belt segment of a conveyor belt, in a top view;

FIG. 4 the conveyor belt segment according to FIG. 3, in a sectional side view along line IV—IV in FIG. 3, and FIG. 5 a further embodiment of the conveyor belt segment according to the FIGS. 2 to 4.

Shown by FIG. 1 is a conveyor device 1 for transferring pieces of luggage 2, 3 which are fed to a conveyor belt 5 in the zone of a feeding location 4. The luggage concerned are pieces of luggage 2, 3 which are unloaded from an airplane load bay and are transferred to the feeding location 4 on a motor vehicle. The feeding location 4 is arranged outside a building indicated by means of a wall section 6.

Said wall section 6 includes two openings 7 through which the conveyor device 1 is guided, with the conveyor belt 5 of this conveyor device being constantly moved in the direction of arrow 8.

The conveyor belt 5 consists of individual plate conveyor belt segments 9 represented in the FIGS. 2 to 4. These conveyor belt segments 9 may be differently designed and consist of plastics or metal. Numerous of such plate-shaped conveyor belt segments 9 are articulated to one another and, in this kind, form a conveyor belt 5 which is curve-going at least to a limited extent.

Shown by FIG. 2 is a conveyor belt segment 9 which is substantially rectangular in shape and has a semicircular recess 10 on one of its longitudinal edges and a semicircular projection 11 on the opposite longitudinal edge.

The conveyor belt 5 has a luggage supporting surface 12 onto which the pieces of luggage 2, 3 are placed in the zone of the feeding location 4. Inside the building, i.e. after the pieces of luggage 2, 3 have been transferred through the opening 7, it is possible for the passengers to collect their pieces of luggage 2, 3 from the conveyor device 1. It can be observed quite frequently that the passengers have to wait a certain time at the conveyor device 1 until the conveyor device 1 starts running, i.e. until the conveyor belt 5 moves and the pieces of luggage 1, 3 are transferred into the building.

The luggage supporting surface 12, which represents the upper surface of the individual conveyor belt segments 9, presents optical information which is an integral part of the conveyor belt segments 9, wherein the optical information as a closed unit is limited to one conveyor belt segment 9 or covers several conveyor belt segments 9 at the same time. By FIG. 2 an embodiment of a conveyor belt segment 9 is shown which includes three pieces of optical information in the form of presentation surfaces 13, said optical information being vulcanized onto the luggage supporting surface 12, i.e. The upper surface of the conveyor belt segment 9. This technique offers itself for conveyor belt segments 9 made of flexible plastic material. However, as an alternative it may be provided that the optical information is engraved, etched, eroded or otherwise machined in the conveyor belt segments 9.

Here it is of particular importance that the optical information forms and integral part of each conveyor belt segment 9, so that the optical information is prevented from being damaged or destroyed by the pieces of luggage 2, 3 put or sliding onto the conveyor belt.

Shown by FIGS. 3 to 5 are alternative constructions of a conveyor belt segment 9.

FIG. 3 shows such a conveyor belt segment 9 which has a sickle-shaped outer contour. This conveyor belt segment 9 consists of a supporting member 14 and a transparent cover member 15, wherein the optical information formed as a foil 16 is arranged on the surface of the cover member 15 facing the supporting member 14, so that the optical information is between said supporting member 14 and said cover member 15.

For receiving the cover member 15, the supporting member 14 has a deepening 17, of which the outer contour corresponds to the outer contour of the cover member 15. Said deepening 17 receives the cover member 15 between continuous rims 18 all around the sides of the cover member in such a way that the cover member 15 is completely arranged within the deepening 17 of the supporting member 14.

It can be seen in FIG. 4 that the upper surface 19 of the cover member 15 is arranged slightly below a surface plane defined by one of the rims 18 of the supporting member 14. Accordingly, a step exists, which as small as within the range of millimeters, between the rims 18 and the upper surface 19 of the cover member 15, said step being indicated in FIG. 4 by means of arrows 20.

By FIG. 5 an alternative construction of a conveyor belt segment 9 according to the principal construction of the conveyor belt segment 9 according to the FIGS. 3 and 4 is shown, wherein the conveyor belt segment 9 according to FIG. 5 has a substantially rectangular outer contour.

The cover member 15 is connected to the supporting member 14 by means of rivets, so that the cover member 15 can be withdrawn from the recess 17 after removing the rivets not further shown. In this manner, the cover member 15 together with the foil 16 arranged thereon and presenting the visual information can be detached and interchanged for a different cover member 15, so that the visual information can be changed in rotation and in this way suited to the requirements of the advertising industry.

As can be seen from the FIGS. 3 and 5, the optical information covers several adjacent and interconnected conveyor belt segments 9 at the same time. FIG. 5, for example, shows a cover member 15 which includes a foil 16 that presents a part of the character A. For the completion of this character A the adjacent conveyor belt segment or segments not shown present the remaining graphical design feature which completes said character A.

What is claimed is:

1. A conveyor device comprising a conveyor belt and a driving member with transmission located downstream, wherein the conveyor belt comprises a plurality of individually connected conveyor belt segments, each conveyor belt segment consisting of a supporting member connected to the driving member, and a transparent cover member, wherein optical information is arranged between the supporting member and the cover member, the cover member being arranged within a recess in the supporting member wherein the recess joins at all of the edges of the cover member.

2. The conveyor device of claim 1, wherein the conveyor belt segments are composed of flexible plastic and further wherein the optical information is vulcanized onto the conveyor belt segments.

3. The conveyor device of claim 1, wherein the optical information is engraved, etched, eroded or otherwise machined in the conveyor belt segments.

4. The conveyor device of claim 1, wherein the optical information is arranged on a foil.

5. The conveyor device of claim 1, wherein the supporting member has a rim around its sides and further wherein the cover member terminates with its upper surface flush with the rim of the supporting member.

6. The conveyor device of claim 1, wherein the supporting member has a rim around its sides and further wherein the upper surface of the cover member is arranged slightly below a surface plane defined by the rim portions of the supporting member.

7. The conveyor device of claim 4, wherein the optical information arranged on a foil is equal in area to the cover member.

8. The conveyor device of claim 1, wherein each of the conveyor belt segments independently includes plural pieces of optical information.

9. The conveyor device of claim 1, wherein the optical information is arranged on the surface of the cover member facing the supporting member.

10. The conveyor device of claim 9, wherein the optical information is provided on the cover member in the form of a color.

11. The conveyor device of claim 9, wherein the optical information is printed on the cover member.

12. The conveyor device of claim 1, wherein the cover member is detachably fixed to the supporting member.

13. The conveyor device of claim 12, wherein the fixing of the cover member to the supporting member is effected by means of screws and/or rivets.

14. The conveyor device of claim 12, wherein the cover member is detachably bonded to the supporting member.

15. The conveyor device of claim 14, wherein the bonding connection between the cover member and the supporting member is effected in part-portions, particularly in the rim portion, and/or punctually.

* * * * *